(12) United States Patent
Seki

(10) Patent No.: US 8,589,467 B2
(45) Date of Patent: Nov. 19, 2013

(54) SYSTOLIC ARRAY AND CALCULATION METHOD

(75) Inventor: Katsutoshi Seki, Tokyo (JP)

(73) Assignee: NEC Corporation, Tokyo (JP)

( * ) Notice: Subject to any disclaimer, the term of this patent is extended or adjusted under 35 U.S.C. 154(b) by 726 days.

(21) Appl. No.: 12/744,450

(22) PCT Filed: Nov. 21, 2008

(86) PCT No.: PCT/JP2008/071220
§ 371 (c)(1),
(2), (4) Date: May 24, 2010

(87) PCT Pub. No.: WO2009/066760
PCT Pub. Date: May 28, 2009

(65) Prior Publication Data
US 2010/0250640 A1    Sep. 30, 2010

(30) Foreign Application Priority Data
Nov. 22, 2007 (JP) ................................ 2007-302536

(51) Int. Cl.
*G06F 17/16* (2006.01)
(52) U.S. Cl.
USPC ....................................................... 708/522
(58) Field of Classification Search
None
See application file for complete search history.

(56) References Cited

U.S. PATENT DOCUMENTS

| 4,727,503 | A  | * | 2/1988  | McWhirter | 708/200 |
|-----------|----|---|---------|-----------|---------|
| 4,823,299 | A  | * | 4/1989  | Chang et al. | 708/446 |
| 6,675,187 | B1 | * | 1/2004  | Greenberger | 708/622 |
| 7,606,207 | B2 | * | 10/2009 | Becker et al. | 370/335 |
| 8,195,733 | B2 | * | 6/2012  | Seki | 708/520 |
| 2008/0028015 | A1 | * | 1/2008 | Seki | 708/522 |
| 2010/0250640 | A1 | * | 9/2010 | Seki | 708/522 |

OTHER PUBLICATIONS

International Search Report for PCT/JP2008/071220 mailed Mar. 3, 2009.
J. G. Nash et al., "Modified Faddeeva Algorithm for Concurrent Execution of Linear Algebraic Operations", IEEE Transactions on Computers, vol. 37, No. 2, Feb. 1988, pp. 129-137.
M. Otte et al., "Matrix Based Signal Processing on a Reconfigurable Hardware Accelerator", Digital Signal Processing Workshop, 2002 and the 2nd Signal Processing Education Workshop., Proceedings of 2002 IEEE 10th, Oct. 2002, pp. 350-355.
K. Seki et al., "A Cordic-Based Reconfigrable Systolic Array Processor for MIMO-OFDM Wireless Communications", Signal Processing Systems, 2007 IEEE Workshop on, Oct. 19, 2007, pp. 639-644.

* cited by examiner

*Primary Examiner* — David H Malzahn

(57) ABSTRACT

A linear systolic array is added to the lower side of a trapezoid systolic array created by combining a triangular systolic array and a square systolic array. In order to make the connection among the cells fixed, the intermediate result output from each row of the trapezoid systolic array to a lower row is shifted in phase with respect to the intermediate result of the complex MFA algorithm, the phase shift is absorbed by the next row, and the phase shift in the intermediate result output from the last row of the trapezoid systolic array is corrected by the linear systolic array. Each cell is implemented by a CORDIC circuit that processes vector angle computation, vector rotation, division, and multiply-and-accumulate with a constant delay.

21 Claims, 12 Drawing Sheets

FIG. 4

| | Step 1 | Step 2 |
|---|---|---|
| BOUNDARY φ CELL | VECTOR ANGLE CALCULATION<br>$x_{in} = 0 \begin{cases} \theta = 0 \\ |x_{in}| = 0 \end{cases}$<br>$x_{in} \neq 0 \begin{cases} |x_{in}| = \sqrt{imag(x_{in})^2 + real(x_{in})^2} \\ \phi = \arctan(imag(x_{in})/real(x_{in})) \\ \phi c_i = \phi c_{i-1} + \phi \end{cases}$ | VECTOR ANGLE CALCULATION<br>$x_{in} = 0 \begin{cases} \theta = 0 \\ |x_{in}| = 0 \end{cases}$<br>$x_{in} \neq 0 \begin{cases} |x_{in}| = \sqrt{imag(x_{in})^2 + real(x_{in})^2} \\ \phi = \arctan(imag(x_{in})/real(x_{in})) \\ \phi c_i = \phi c_{i-1} + \phi \end{cases}$ |
| BOUNDARY θ CELL | VECTOR ANGLE CALCULATION<br>$x_{in} = 0 \begin{cases} \theta = 0 \\ r : unchanged \end{cases}$<br>$x_{in} \neq 0 \begin{cases} t = \sqrt{r^2 + |x_{in}|^2} \\ \theta = \arctan(|x_{in}|/r) \\ r = t \end{cases}$ | DIVISION<br>$d = |x_{in}|/r$ |
| INTERNAL φ CELL | VECTOR ROTATION<br>COMPLEX FORMAT<br>$tmp = x_{in} \exp(-i\phi)$<br>REAL/IMAGINARY SEPARATION FORMAT<br>$\begin{bmatrix} real(tmp) \\ imag(tmp) \end{bmatrix} = \begin{bmatrix} \cos\phi & \sin\phi \\ -\sin\phi & \cos\phi \end{bmatrix} \begin{bmatrix} real(x_{in}) \\ imag(x_{in}) \end{bmatrix}$ | VECTOR ROTATION<br>COMPLEX FORMAT<br>$tmp = x_{in} \exp(-i\phi)$<br>REAL/IMAGINARY SEPARATION FORMAT<br>$\begin{bmatrix} real(tmp) \\ imag(tmp) \end{bmatrix} = \begin{bmatrix} \cos\phi & \sin\phi \\ -\sin\phi & \cos\phi \end{bmatrix} \begin{bmatrix} real(x_{in}) \\ imag(x_{in}) \end{bmatrix}$ |
| INTERNAL θ CELL | VECTOR ROTATION<br>COMPLEX FORMAT<br>$(r + i * x_{out}) = (r + i * tmp) * \exp(-i\theta)$<br>REAL/IMAGINARY SEPARATION FORMAT<br>$\begin{bmatrix} real(r) & imag(r) \\ real(x_{out}) & imag(x_{out}) \end{bmatrix}$<br>$= \begin{bmatrix} \cos\theta & \sin\theta \\ -\sin\theta & \cos\theta \end{bmatrix} \begin{bmatrix} real(r) & imag(r) \\ real(tmp) & imag(tmp) \end{bmatrix}$ | SUM OF PRODUCT CALCULATION<br>$\begin{bmatrix} real(r) & imag(r) \\ real(x_{out}) & imag(x_{out}) \end{bmatrix}$<br>$= \begin{bmatrix} 1 & 0 \\ -d & 1 \end{bmatrix} \begin{bmatrix} real(r) & imag(r) \\ real(tmp) & imag(tmp) \end{bmatrix}$ |
| TERMINAL CELL | IDLE | VECTOR ROTATION<br>COMPLEX FORMAT<br>$x_{out} = x_{in} \exp(-i\phi)$<br>REAL/IMAGINARY SEPARATION FORMAT<br>$\begin{bmatrix} real(x_{out}) \\ imag(x_{out}) \end{bmatrix} = \begin{bmatrix} \cos\phi & \sin\phi \\ -\sin\phi & \cos\phi \end{bmatrix} \begin{bmatrix} real(x_{in}) \\ imag(x_{in}) \end{bmatrix}$ |

REFERENCE CASE

REFERENCE CASE

FIG. 10
RELATED ART

| | Step 1 | Step 2 |
|---|---|---|
| BOUNDARY CELL<br>INPUT TO CELL $x_{in}$<br>(r)<br>PARAMETER s, c, d | $x_{in} = 0 \quad \begin{cases} c = 1, s = 0 \\ r : unchanged \end{cases}$<br><br>$x_{in} \neq 0 \quad \begin{cases} t = \sqrt{r^2 + x_{in}^2} \\ c = r/t, s = x_{in}/t \\ r = t \end{cases}$ | $d = x_{in}/r$<br>$r : unchanged$ |
| INTERNAL CELL<br>INPUT TO CELL $x_{in}$<br>[r]<br>PARAMETER s, c, d    PARAMETER s, c, d<br>OUTPUT FROM CELL $x_{out}$ | $\begin{bmatrix} r \\ x_{out} \end{bmatrix} = \begin{bmatrix} c & s \\ -s & c \end{bmatrix} \begin{bmatrix} r \\ x_{in} \end{bmatrix}$ | $\begin{bmatrix} r \\ x_{out} \end{bmatrix} = \begin{bmatrix} 1 & 0 \\ -d & 1 \end{bmatrix} \begin{bmatrix} r \\ x_{in} \end{bmatrix}$ |

FIG. 12
RELATED ART

|  | Step 1 | Step 2 |
|---|---|---|
| BOUNDARY CELL<br><br>INPUT TO CELL $x_{in}$<br>$r$<br>パラメータ<br>$\theta, d$ | $x_{in} = 0 \quad \begin{cases} \theta = 0 \\ r : unchanged \end{cases}$<br><br>$x_{in} \neq 0 \quad \begin{cases} t = \sqrt{r^2 + x_{in}^2} \\ \theta = \arctan(x_{in}/r) \\ r = t \end{cases}$ | $d = x_{in}/r$<br>$r : unchanged$ |
| INTERNAL CELL<br><br>INPUT TO CELL $x_{in}$<br>$r$<br>PARAMETER PARAMETER<br>$\theta, d$ $\theta, d$<br>OUTPUT FROM CELL $x_{out}$ | $\begin{bmatrix} r \\ x_{out} \end{bmatrix} = \begin{bmatrix} \cos\theta & \sin\theta \\ -\sin\theta & \cos\theta \end{bmatrix} \begin{bmatrix} r \\ x_{in} \end{bmatrix}$ | $\begin{bmatrix} r \\ x_{out} \end{bmatrix} = \begin{bmatrix} 1 & 0 \\ -d & 1 \end{bmatrix} \begin{bmatrix} r \\ x_{in} \end{bmatrix}$ |

SYSTOLIC ARRAY AND CALCULATION METHOD

The present invention is the National Phase of PCT/JP2008/071220, filed on Nov. 21, 2008, which claims priority from Japanese Patent Application No. 2007-302536 (filed on Nov. 22, 2007) the content of which is hereby incorporated in its entirety by reference into this specification.

TECHNICAL FIELD

The present invention relates to a systolic array, and more particularly to a complex matrix computing systolic array and a computation method for performing a complex matrix computation using CORDIC (Coordinate Rotation Digital Computer) circuits.

BACKGROUND ART

Matrix computations are widely used for wireless communication, wired communication, and image processing. Recently, to cope with an increase in wireless or wired communication speed, attention has been paid to a systolic array with which parallel computations can be performed effectively.

A systolic array is configured to have a plurality of processing cells arranged one-dimensionally or two-dimensionally, in which data exchange between processing cells is performed only between adjacent processing cells. Because of its regularity and ease of wiring, a systolic array is suitable for integration into such as a VLSI and so forth. The optimal topology of a systolic array differs according to the type of matrix computations (matrix multiplication, QR factorization, least square method, etc.). For example, a triangular configuration is optimal for performing QR factorization, while a square configuration is optimal for computing a matrix multiplication. It is suggested that, in case of implementing multiple types of matrix computations, a systolic array which implements a single algorithm be prepared and each matrix computation be mapped to a single algorithm. This method, though not optimal for each matrix computation, has an advantage in that it is versatile.

As an algorithm for carrying out multiple matrix computations, the Modified Faddeeva Algorithm (abbreviated to "MFA") is known. In the MFA, two steps of processing are performed as shown in Expression (1).

$$\begin{bmatrix} A & B \\ -C & D \end{bmatrix} \rightarrow \begin{bmatrix} R & Q^tB \\ -C & D \end{bmatrix} \rightarrow \begin{bmatrix} R & Q^tB \\ 0 & E \end{bmatrix} \quad (1)$$

In the first step, QR factorization is performed (that is, A=QR where Q is a unitary matrix) on the matrix A using the Givens rotation. Similarly, the Givens rotation is applied to matrix B as well. This processing is equivalent to the multiplication of matrices A and B by $Q^T$ from left. That is, when [A B]=[QR B] is multiplied by $Q^T$ (where $^T$ denotes Hermite transpose) from left, $[Q^T QR\ Q^T B]=[R\ Q^T B]$ is obtained because of $Q^TQ=I$ (a unit matrix) and, therefore, the expression in the middle of Expression (1) is obtained. In the second step, C is eliminated by the Gaussian elimination method with diagonal elements of the triangular matrix R as pivot elements. In this case, the matrix E is given by Expression (2).

$$E=D-(-R^{-t}C^t)^tQ^tB=D+CA^{-1}B \quad (2)$$

By changing the matrices to be substituted into A, B, C, and D, the MFA can implement various matrix computations that will be shown below. When only the first step is performed, the QR factorization can be implemented.

Linear system solution (AX=B):

$$\begin{bmatrix} A & B \\ -I & 0 \end{bmatrix} \Rightarrow E = A^{-1}B$$

Matrix multiplication:

$$\begin{bmatrix} I & B \\ -C & 0 \end{bmatrix} \Rightarrow E = CB$$

Inverse matrix:

$$\begin{bmatrix} A & I \\ -I & 0 \end{bmatrix} \Rightarrow E = A^{-1}$$

FIG. 8A and FIG. 8B are diagrams showing signal flow graphs when real MFA computation is carried out using systolic arrays.

In the triangular systolic array in FIG. 8A, the upper triangular matrix R is obtained in step 1. As shown in FIG. 8A, the rotation parameter of the Givens rotation propagates to the right and, in the square systolic array, $Q^TB$ is computed.

In step 2, C and D are input to the triangular systolic array and the square systolic array, respectively, as shown in FIG. 8B. In this case, $$-R^{-T}C^T$$

propagates in the horizontal direction, and from the lower side of the square systolic array, $$E=D+CA^{-1}B \text{ is output.}$$

FIG. 9 is a diagram showing the configuration of a real MFA systolic array 4001 where the matrix sizes are A(2×2), B(2×2), C(2×2), and D(2×2) and all elements of the matrices are real numbers. The detail of this related art is disclosed in Non-Patent Document 1. Note that, in this specification, "A(m×n)" indicates that the matrix A is a m×n matrix. The same holds true in other matrices as well. In FIG. 9, $a_{ij}$ represents the element in the ith row and in the jth column of the matrix A. The same holds true in other matrices as well.

Referring to FIG. 9, the real MFA systolic array 4001, a trapezoid-shaped systolic array created by combining a triangular systolic array 1000 and a square systolic array 2000, has boundary cells 101 and internal cells 201.

The boundary cells 101 are arranged diagonally in the triangular systolic array 1000.

In FIG. 9, xin and xout are an input from the upper cell, and an output to the lower cell, of each cell, respectively.

s, c, and d are parameters propagated horizontally from the boundary cells 101 to the internal cells 201.

The lower subscript of the boundary cell 101, internal cell 201, xin, and xout denotes each the position index of each cell, and (ij) indicates the cell in the ith row and in the jth column; for example, $xin_{11}$ indicates an input to the cell in the first row and in the first column, $xin_{12}$ indicates an input to the cell in the first row and in the second column, and so on. Because this systolic array is a trapezoid array, there is no cell with the lower subscript (2,1).

The parameters $s_i$, $c_i$, and $d_i$ are parameters output from the boundary cell 101 in the ith row.

The real MFA systolic array 4001 performs the MFA processing in two steps.

In step 1, the matrices A and B are input to the top of the triangular systolic array 1000 and the square systolic array 2000.

In step 2, the matrices C and D are input to the top of the triangular systolic array 1000 and the square systolic array 2000.

In step 2, the matrix E is output from the bottom of the square systolic array 2000. Note that, as shown in FIG. 9, a delay (skew) in the input/output data must be adjusted. The symbol (■) in the input $xin_{12}$, $xin_{13}$, $xin_{14}$ and in the output $xout_{23}$ and $xout_{24}$ in FIG. 9 represents a delay (unit delay), respectively.

FIG. 10 is a diagram showing the computation processing in steps 1 and 2 in the boundary cell 101 and the internal cell 201. In FIG. 10, r is a variable saved in a cell, and its initial value is 0.

In the real MFA systolic array 4001, the processing differs according to the type of cell and according to steps.

This means that, if each cell is implemented by a general-purpose processor and the processing shown in FIG. 10 is performed exactly as shown, the processing delay (processing load) differs according to the type of cell and according to steps. This makes the inter-cell synchronizing control circuit complex and increases the circuit size.

Conversely, if the processing delay is made uniform among the cells (processing delays are adjusted to the maximum processing delay) for simplifying the synchronization control circuit, the operation rate of the processors in the cells is lowered and so the efficiency is deteriorated.

In addition, if special computation circuits such as a multiplier, a divider, and a square rooter are combined to realize a cell, some special computation circuit performs operation only in one of the steps. In this case, too, the operation rate of the computation circuits is decreased and so the efficiency is reduced.

To solve this problem, an MFA systolic array, which realizes the processing of each cell with one CORDIC circuit, is disclosed in Non-Patent Document 2.

FIG. 11 is a diagram showing the configuration of the real MFA systolic array disclosed in Non-Patent Document 2 where the matrix sizes are A(2×2), B(2×2), C(2×2), and D(2×2) and all elements of the matrices are real numbers.

The real MFA systolic array 4001 is similar to the real MFA systolic array disclosed in Non-Patent Document 1 except that, instead of the rotation parameters s and c, the angle θ is propagated horizontally.

FIG. 12 is a diagram showing the computation processing of the boundary cell 101 and the internal cell 201 in the real MFA systolic array 4001 in steps 1 and 2 in FIG. 11.

First, the operation in step 1 will be described. The boundary cell 101 receives the input xin from the upper side and computes the norm t and the vector angle θ of the vector [r xin]$^t$ using the CORDIC algorithm.

The internal variable r is updated by the norm t, and the vector angle θ is propagated to the right and is supplied to the internal cell 201 in the same row.

The internal cell 201 receives the input xin from the upper side, receives the vector angle θ from the left and, using the CORDIC algorithm, performs the vector rotation processing represented by $$xout = \cos\theta \cdot xin - \sin\theta \cdot r$$

$$r = \sin\theta \cdot xin + \cos\theta \cdot r \qquad (3)$$

and computes the output xout and the internal variable r.

The internal cell 201 supplies the output xout to the cell in the lower row.

In the internal cell 201, the vector rotation angle θ supplied from the left cell is propagated directly to the internal cell 201 on the right side.

Next, the operation in step 2 will be described.

The boundary cell 101 receives the input xin from the upper side and performs the following division using the CORDIC algorithm.

$$d = xin/r \qquad (4)$$

The division result d is propagated horizontally and is supplied to the internal cell 201 in the same row.

In addition, the internal cell 201 performs the following multiply-and-accumulate using the CORDIC algorithm.

$$xout = xin - d \cdot r \qquad (5)$$

In the internal cell 201, the output xout is supplied to the cell in the lower row. Note that, the output xout of the internal cell 201 at the bottom is output outside the MFA systolic array 4001 as an element of the MFA computation result matrix E.

The processing of the boundary cell 101 and the internal cell 201 in step 1 corresponds respectively to the vector angle computation processing and the vector rotation processing.

The processing of the boundary cell 101 and the internal cell 201 in step 2 corresponds respectively to the division processing and the sum-of-product processing.

It is known that the processing described above can be performed with the same delay by the CORDIC algorithm.

Therefore, because the processing delay of the cells is not affected by the cell type or the step but is constant and the inter-cell connection relation is fixed in the real MFA systolic array 4001 disclosed in the Non-Patent Document 2, there is no need for an inter-cell synchronization control circuit.

In addition, because the CORDIC circuit that is the computation circuit in the cells is always in operation, efficiency is increased.

[Non-Patent Document 1] J. G. Nash, "Modified Faddeeva algorithm for concurrent execution of linear algebraic operations", IEEE Trans. Computers, vol. 37, No 2, pp 129-137 (1988)

[Non-Patent Document 2] M. Otte, J. Gotze, M. Bucker, "Matrix based signal processing on a reconfigurable hardware accelerator", Digital Signal Processing Workshop, 2002 and the 2nd Signal Processing Education Workshop. Proceedings of 2002 IEEE, 13-16 Oct. 2002 Page(s): 350-355

SUMMARY

The disclosure of Non-Patent Document 1 and Non-Patent Document 2 given above is hereby incorporated by reference into this specification. The following analysis is given by the present invention.

The MFA systolic array disclosed in Non-Patent Document 2 requires that the input matrix be real, and is not compatible with complex matrix computations frequently used in the wireless signal processing or the image signal processing.

Non-Patent Document 2 describes a method for decomposing complex matrix computations into real matrix computations. However, this method results in an increase the size of the CORDIC.

It is an object of the present invention to provide a systolic array and a computation method in which cells each have the same computation circuit, an operation rate of a computation circuit is high, and a processing delay of the computation circuit is not dependent on a cell type and a step but is constant.

It is another object of the present invention to provide a systolic array and a computation method that does not require a synchronization control circuit.

It is still another object of the present invention to provide a systolic array and a computation method that can implement a complex matrix computation algorithm.

The present invention may be summarized as follows.

According to the present invention, there is provided a systolic array in which a linear systolic array is added to a lower side of a trapezoid systolic array that is a combination of a triangular systolic array and a square systolic array. In the systolic array, in order to make the connection among the cells fixed, an intermediate result output from each row of the trapezoid systolic array to a lower row is shifted in phase with respect to the intermediate result of the complex MFA algorithm, the phase shift is absorbed by the next row, and the phase shift in the intermediate result output from the last row of the trapezoid systolic array is corrected by the linear systolic array.

In the present invention, each of second and subsequent rows of the trapezoid systolic array comprises:

a boundary processing unit that receives a first component of the phase-shifted MFA intermediate processing result and a phase shift parameter supplied from the preceding row and generates first and second vector rotation parameters, a multiply-and-accumulate coefficient, and a phase shift parameter; and a plurality of internal processing units, each of which receives a component other than the first component of the phase-shifted MFA intermediate processing result, the first and second vector rotation parameters, and the multiply-and-accumulate coefficient and supplies the phase-shifted MFA intermediate processing result to the following row.

In the present invention, each of the boundary processing unit and the internal processing unit is a super cell including a plurality of processing cells.

In the present invention, each of the processing cells comprises a CORDIC circuit that processes vector angle computation, vector rotation, division, and multiply-and-accumulate with a predetermined delay and the connection relation among the processing cells is made fixed.

In the present invention, the boundary processing unit comprises first and second boundary processing cells. In a first step, the first boundary processing cell generates, based on an input signal from the internal processing unit in a preceding row, a norm of the input signal and a vector angle of a vector having a real part and an imaginary part of the input signal as elements, and supplies the vector angle to an internal processing unit in the same row as the first vector rotation parameter. The second boundary processing cell generates a norm and a vector angle of a vector having an internal variable and the norm of the input signal as elements, supplies the vector angle to the internal processing unit in the same row as the second vector rotation parameter, and updates the internal variable by the vector norm.

In a second step, the first boundary processing cell generates, based on an input signal from the internal processing unit in the preceding row, a norm of the input signal and a vector angle of a vector having a real part and an imaginary part of the input signal as elements, supplies the vector angle to the internal processing unit in the same row as the first vector rotation parameter and, in addition, adds the phase shift parameter, supplied from the preceding row (where the phase shift parameter supplied from the preceding row in a first row in the first boundary processing cell is 0), to the first vector rotation parameter and supplies the resulting parameter to the following row. The second boundary processing cell divides the norm of the input signal by the internal variable and supplies the division result to the internal processing unit in the same row as the multiply-and-accumulate coefficient.

In the present invention, the internal processing unit comprises first to third internal processing cells. In a first step, the first internal processing cell phase-rotates an input signal from the internal processing unit in a preceding row by an angle indicated by the first vector rotation parameter to generate a phase-rotated input signal.

The second internal processing cell rotates a vector having a real part of the phase-rotated input signal and a real part of the internal variable as elements by an angle indicated by the second vector rotation parameter, updates the real part of the internal variable by a first element of the vector, and supplies a second element to the following row. The third internal processing cell rotates a vector having an imaginary part of the phase-rotated input signal and an imaginary part of the internal variable as elements by an angle indicated by the second vector rotation parameter, updates the imaginary part of the internal variable by a first element of the vector, and supplies a second element to the following row.

In a second step, the first internal processing cell phase-rotates the input signal, received from the internal processing unit in the preceding row, by an angle indicated by the first vector rotation parameter to generate a phase-rotated input signal.

The second internal processing cell supplies a value, generated by adding the product of the real part of the internal variable and the multiply-and-accumulate coefficient to the real part of the phase-rotated input signal, to the following row.

The third internal processing cell supplies a value, generated by adding the product of the imaginary part of the internal variable and the multiply-and-accumulate coefficient to the imaginary part of the phase-rotated input signal, to the following row.

In the present invention, one side of the triangular systolic array and one side of the square systolic array are joined together to form a longer side of the two opposed parallel sides of the trapezoid systolic array, another side opposed to the one side of the square systolic array forms a shorter side of the trapezoid systolic array.

The trapezoid systolic array has the longer side as an upper side, and the shorter side as a lower side.

The linear systolic array is arranged in a position opposed to the lower side of the trapezoid systolic array.

The trapezoid systolic array receives an input from the upper-side side, and outputs an output from the linear systolic array positioned on the lower-side side of the trapezoid systolic array.

The boundary processing unit is positioned on the hypotenuse of the triangular systolic array.

The internal processing units are arranged in rows and in columns other than rows and columns on the hypotenuse of the triangular systolic array and in rows and in columns of the square systolic array.

In the present invention, the boundary processing unit comprises the first and second boundary processing cells (boundary $\Phi$ cell and boundary $\theta$ cell). In a first step, an input xin from an upper side is supplied to the first boundary processing cell and the first boundary processing cell (boundary $\Phi$ cell) computes a norm |xin| of a vector (real(xin),imag(xin)) having a real part and an imaginary part of the input xin as elements, and its vector angle Φ(=arctan(imag(xin)/real(xin))), supplies the norm |xin| of the input to the second boundary processing cell, and supplies the vector angle Φ to an adjacent internal processing unit in the same row.

The second boundary processing cell (boundary θ cell) receives the norm |xin| of the input signal from the first boundary processing cell (boundary Φ cell), computes a norm t of a vector having an internal variable r and |xin| as elements (r,|xin|) and its vector angle θ(=arctan(|xin|/r), updates the internal variable r by the norm t (r=t), and supplies the vector angle θ to the adjacent internal processing unit in the same row.

In a second step, an input xin from an upper side is supplied to the first boundary processing cell (boundary Φ cell), and a phase shift parameter Φc is supplied from the boundary processing unit in an upper oblique direction to the first boundary processing cell in the boundary processing unit in second and subsequent rows.

the first boundary processing cell (boundary Φ cell) computes a norm |xin| of a vector having a real part and an imaginary part of the input xin as elements and its vector angle Φ, supplies the norm |xin| to the second boundary processing cell, supplies the vector angle Φ to the adjacent internal processing unit in the same row, and supplies a value (Φci−1+Φ), created by adding the vector angle Φ to the phase shift parameter Φc received from the boundary processing unit in the upper oblique direction, to the first boundary processing cell of the boundary processing unit in the lower oblique direction or to a terminal cell in the linear systolic array as a new phase shift parameter (Φci).

The second boundary processing cell receives the norm |xin| from the first boundary processing cell, performs division d=|xin|/r, and supplies the division result d to the adjacent internal processing unit in the same row as a multiply-and-accumulate coefficient.

In the present invention, the internal processing unit comprises first to third internal processing cells. In a first step, an input xin from an upper side and the vector angle Φ, propagated from the adjacent cell on a side of the boundary processing unit in the same row, are supplied to the first internal processing cell (internal Φ cell). The first internal processing cell (internal Φ cell) supplies a vector (tmp=xin·exp(−iΦ)), generated by rotating a vector having a real part and an imaginary part of the input xin as elements by the vector angle Φ, to the second and third internal processing cells (internal θ cell) respectively. The first internal processing cell supplies the vector angle Φ, supplied from the adjacent cell on the side of the boundary processing unit in the same row, directly to a first internal processing cell of an adjacent internal processing unit in a direction opposite to the boundary processing unit in the same row. The second and third internal processing cells (internal θ cells) calculate an output xout and an internal variable r by performing vector rotation processing represented by $$x\text{out} = \cos\theta \cdot tmp - \sin\theta \cdot r;$$

$$r = \sin\theta \cdot tmp + \cos\theta \cdot r$$

for the vector (tmp), the internal variable r, and the vector angle θ.

In a second step, an input xin from the upper side and the vector angle Φ, propagated from the adjacent cell on the side of the boundary processing unit in the same row, are supplied to the first internal processing cell (internal Φ cell) of the internal processing unit. The first internal processing cell (internal Φ cell) supplies a vector (tmp), generated by rotating a vector having a real part and an imaginary part of the input xin as elements by the vector angle Φ, to the second and third internal processing cells (internal θ cell) respectively. The first internal processing cell supplies the vector angle Φ, supplied from the adjacent cell on the side of the boundary processing unit, directly to the first internal processing unit of the adjacent internal processing unit in a direction opposite to the boundary processing unit in the same row.

The second and third internal processing cells (internal θ cell) calculate an output xout by performing multiply-and-accumulate processing represented by xout=tmp−d·r.

A terminal cell of the linear systolic array receives the output xout from the internal processing unit at the bottom of the trapezoid systolic array as an input xin, receives a phase shift parameter Φc from the boundary processing unit in the upper oblique direction, and computes a vector by rotating a vector having a real part and an imaginary part of the input xin as elements by an angle Φc and outputs the result as an output xout.

In the present invention, the linear systolic array comprises a plurality of terminal processing cells each of which performs phase rotation for an input signal from the internal processing unit in the last row of the trapezoid systolic array based on the phase shift parameter supplied from the last row of the trapezoid systolic array.

In accordance with the present invention, there is provided a communication system having the complex matrix computing systolic array described above.

In accordance with the present invention, there is provided an image processing system having the complex matrix computing systolic array described above.

In accordance with the present invention, the operation rate of the CORDIC circuit is high and the efficiency is increased because all processing is implemented by the CORDIC circuit irrespective of the cell type and steps.

In accordance with the present invention, there is no need for a synchronization control circuit because the cells are implemented by the CORDIC circuit, the processing delay of the CORDIC circuit is constant irrespective of the cell type and steps, and the connection relation among cells is fixed.

In accordance with the present invention, the complex matrix computation algorithm, which cannot be implemented by the related art, may be implemented.

Still other features and advantages of the present invention will become readily apparent to those skilled in this art from the following detailed description in conjunction with the accompanying drawings wherein only exemplary embodiments of the invention are shown and described, simply by way of illustration of the best mode contemplated of carrying out this invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 4 is a diagram showing the operation of the processing cells included in the first exemplary embodiment of the present invention.

FIG. 10 is a diagram showing the operation of the processing cells of the real MFA systolic array described in Non-Patent Document 1.

FIG. 12 is a diagram showing the operation of the processing cells of the real MFA systolic array described in Non-Patent Document 2.

PREFERRED MODES

Figure 1:
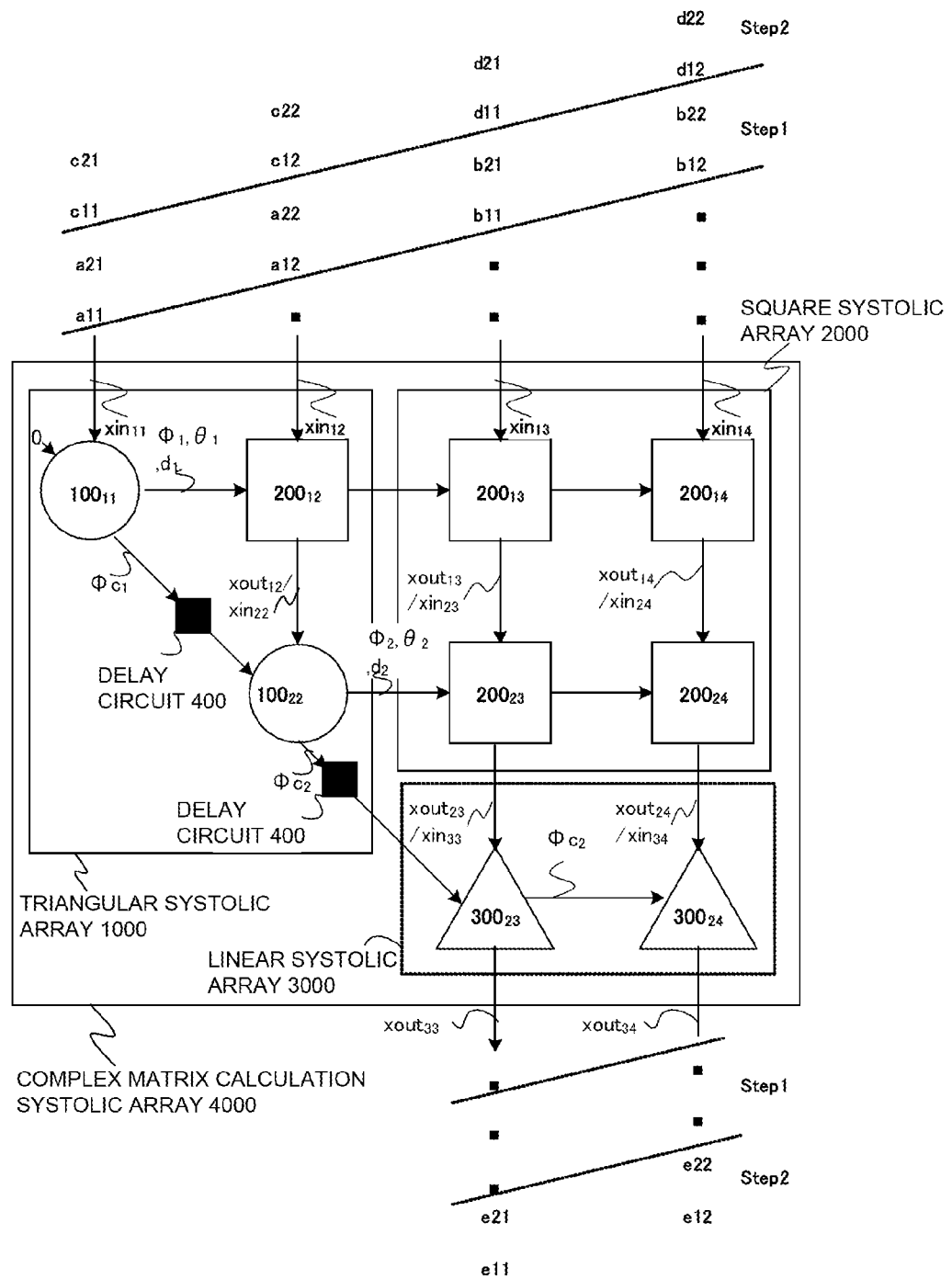
FIG. 1 is a diagram showing a first exemplary embodiment of the present invention.

Next, exemplary embodiments of the present invention will be described. FIG. 1 is a diagram showing the configuration of a complex matrix computing systolic array in a first embodiment of the present invention. In the description of this exemplary embodiment, an example is used in which the matrix sizes are A(2×2), B(2×2), C(2×2), and D(2×2). Note that, in the present invention, the matrix sizes are not of course limited to the configuration described above.

A complex matrix computing systolic array 4000 in this exemplary embodiment comprises:
  a triangular systolic array 1000,
  a square systolic array 2000, and
  a linear systolic array 3000.

The triangular systolic array 1000 includes boundary super cells 100, an internal super cell 200, and delay circuits 400.

The boundary super cells 100 are arranged diagonally in the triangular systolic array 1000.

The square systolic array 2000 includes multiple internal super cells 200.

The linear systolic array 3000 includes terminal cells 300.

Figure 9:
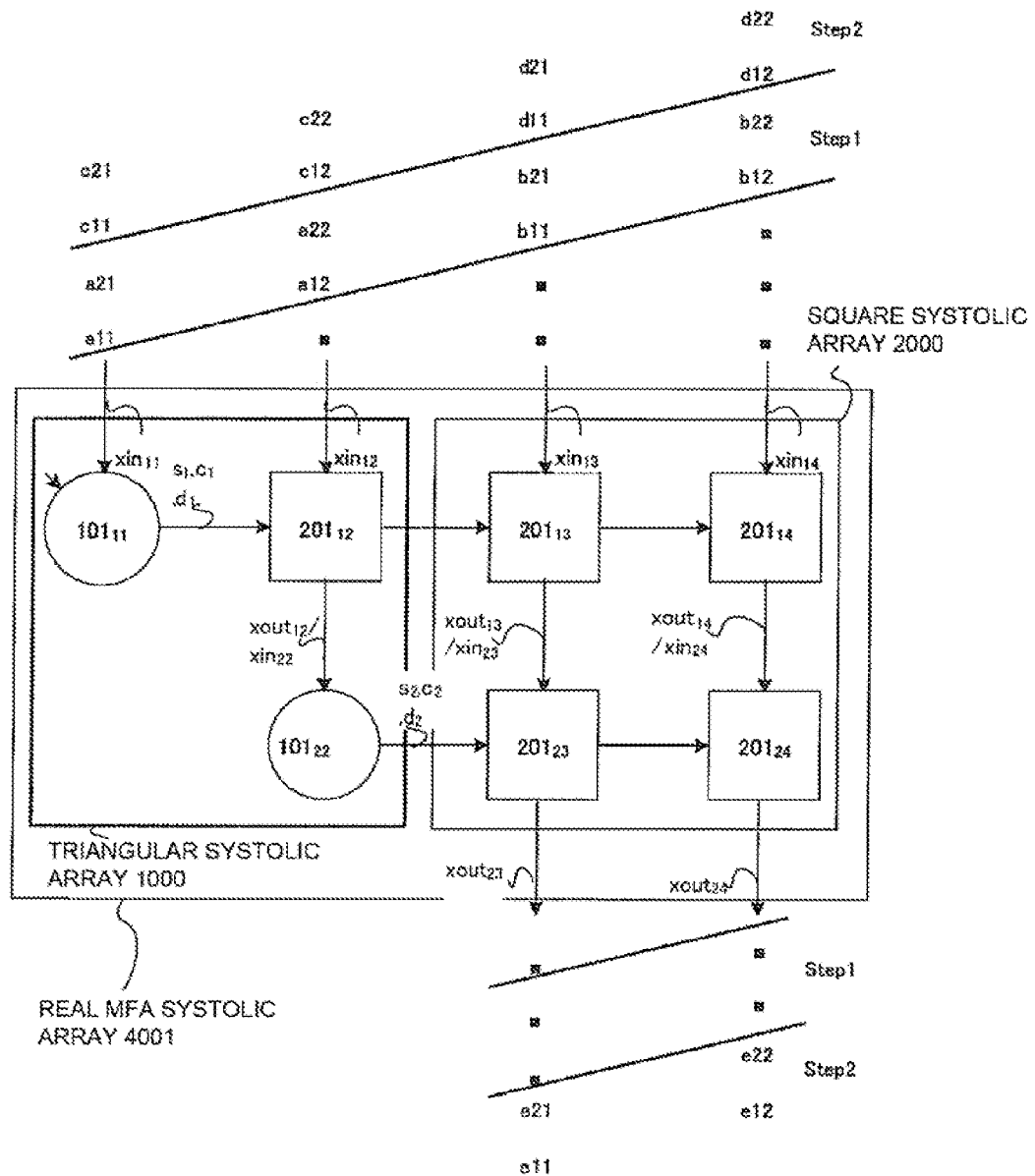
FIG. 9 is a diagram showing the configuration of the real MFA systolic array described in Non-Patent Document 1.
Figure 11:
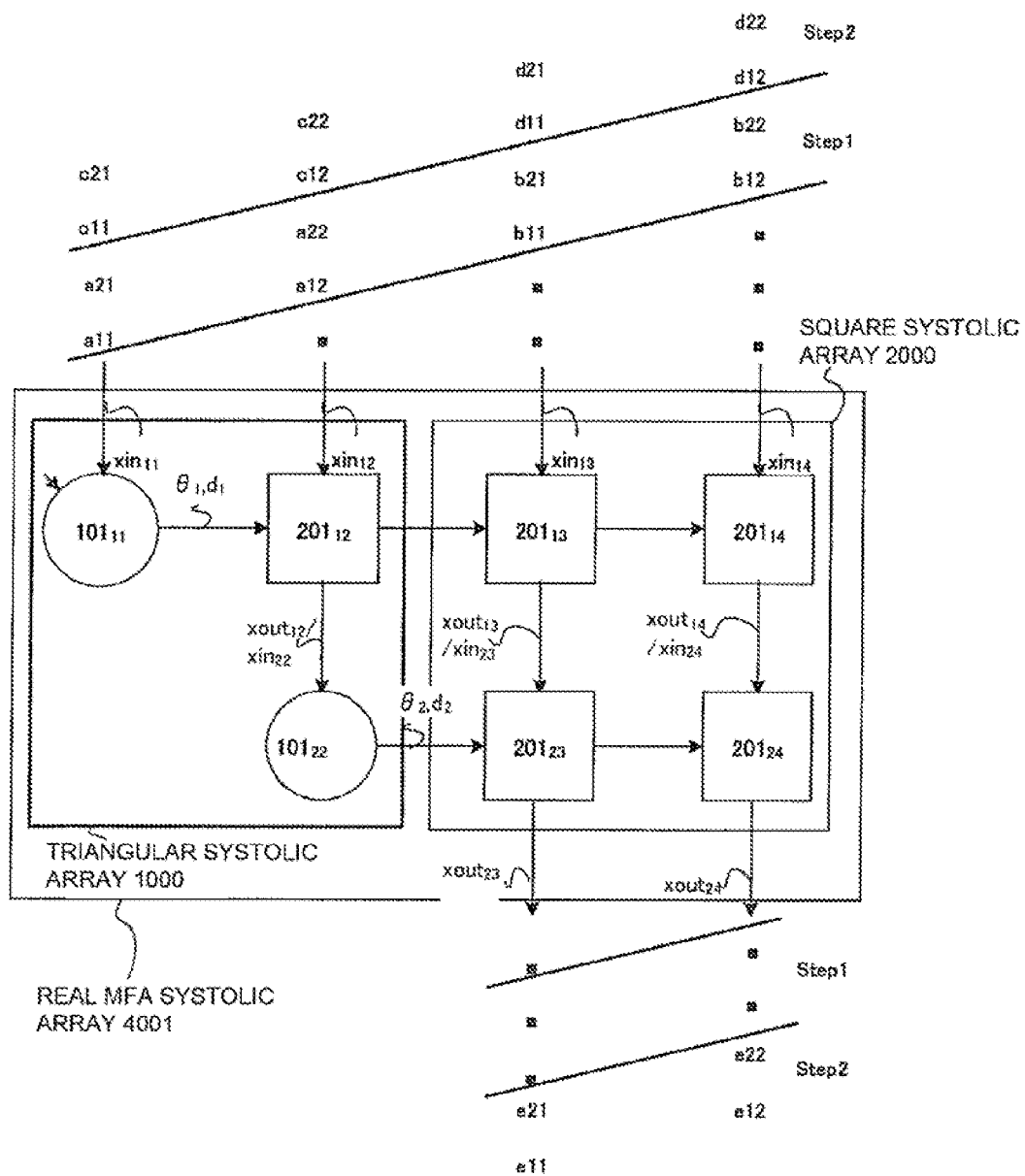
FIG. 11 is a diagram showing the configuration of the real MFA systolic array described in Non-Patent Document 2.

The complex matrix computing systolic array 4000 in this exemplary embodiment differs from the real MFA systolic array 4001, shown in FIG. 9, in that the linear systolic array 3000 is added.

In addition, instead of the boundary cells 101 and the internal cells 201, the boundary super cells 100 and the internal super cells 200, each composed of a plurality of cells, are used.

In addition, a path to the lower right cell of the boundary super cell 100 is added to transfer the phase shift parameter $\Phi_c$ via the delay circuit 400.

xin and xout in FIG. 1 are an input from the upper side, and an output to the lower side, of each cell respectively.

$\Phi$, $\theta$, and d in FIG. 1 are parameters supplied from the boundary super cell 100 and propagated in the horizontal direction.

$\Phi$c in FIG. 1 is a phase shift parameter supplied from the boundary super cell 100 to the lower right cell.

The lower subscript of the boundary super cell 100, internal super cell 200, xin, and xout in FIG. 1 denotes the position index of the cell, and (ij) means the cell in the ith row and in the jth column. The parameters $\Phi i$, $\Phi ci$, $\theta i$, and di are parameters output from the boundary super cell 100 in the ith row.

In this exemplary embodiment, the complex matrix computing systolic array 4000 performs the MFA processing in two steps.

In step 1, the matrices A and B are input to the top of the triangular systolic array 1000 and the square systolic array 2000 respectively.

In step 2, the matrices C and D are input to the top of the triangular systolic array 1000 and the square systolic array 2000 respectively.

In step 2, the matrix E is output from the bottom of the linear systolic array 3000. As shown in FIG. 1, the delay (skew) in the input/output data must be adjusted.

Figure 2:
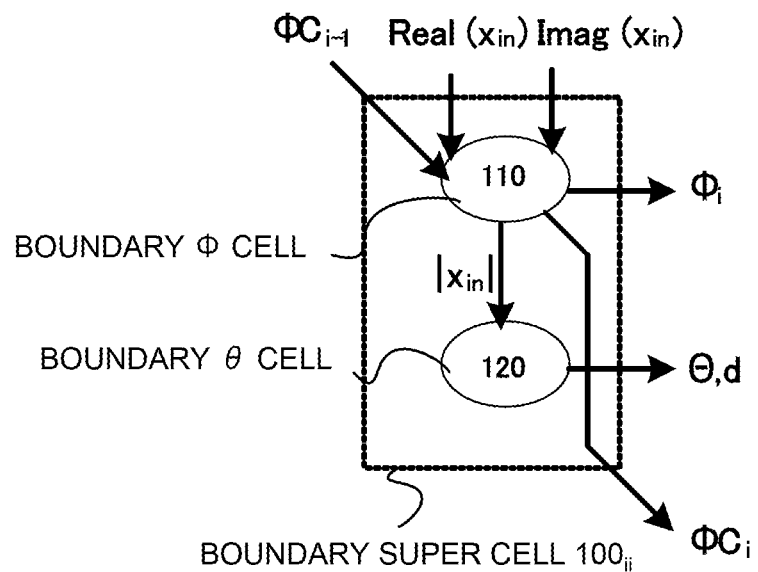
FIG. 2 is a diagram showing the configuration of a boundary super cell included in the first exemplary embodiment of the present invention.
Figure 3:
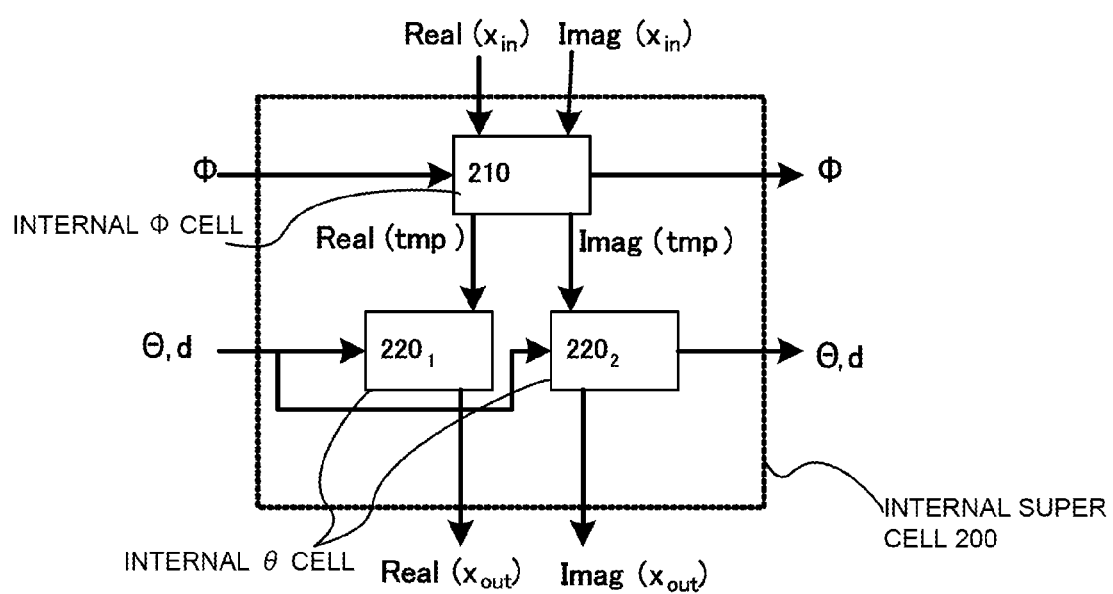
FIG. 3 is a diagram showing the configuration of an internal super cell included in the first exemplary embodiment of the present invention.

FIG. 2 is a diagram showing the configuration of the boundary super cell 100 shown in FIG. 1. FIG. 3 is a diagram showing the configuration of the internal super cell 200 shown in FIG. 1.

Referring to FIG. 2, the boundary super cell 100 comprises a boundary $\Phi$ cell 110 and a boundary $\theta$ cell 120.

Referring to FIG. 3, the internal super cell 200 comprises an internal $\Phi$ cell 210 and two internal $\theta$ cells $220_1$ and $220_2$.

FIG. 4 shows the computation processing in steps 1 and 2 of each cell. In FIG. 4, r is an internal variable saved in the cell and its initial value is 0.

First, the operation of step 1 will be described. In the boundary super cell 100, the input xin received from the upper side is supplied to the boundary $\Phi$ cell 110.

The phase shift parameter $\Phi_c$ is supplied to the boundary $\Phi$ cell 110. Note that, in step 1, the phase shift parameter $\Phi$c is not used.

The phase shift parameter $\Phi_c$, supplied to the boundary $\Phi$ cell 110 in the first row, is fixed to 0.

The boundary $\Phi$ cell 110 uses the CORDIC algorithm to calculate the norm $$|xin| = \sqrt{\text{real}(xin)^2 + \text{imag}(xin)^2}$$

and the vector angle $\Phi(=\arctan(\text{imag}(xin)/\text{real}(xin)))$ of the vector [real(xin) imag(xin)]$^t$. In the above description, arctan is the inverse tangent function.

The norm |xin| is supplied to the boundary $\theta$ cell 120, and the vector angle $\Phi$ is propagated to the right and supplied to the internal super cell 200 in the same row.

The boundary $\theta$ cell 120 receives the norm |xin| and uses the CORDIC algorithm to calculate the norm t $(=\sqrt{r^2+|xin|^2})$ and the vector angle $\theta(=\arctan(|xin|/r)$ of the vector [r |xin|]$^t$. The internal variable r is updated by the norm t, and the vector angle $\theta$ is propagated to the right and is supplied to the internal super cell 200 in the same row.

In the internal super cell 200, the input xin received from the upper side and the vector angle $\Phi$ received from the left side are supplied to the internal $\Phi$ cell 210.

The internal $\Phi$ cell 210 supplies the vector [real(tmp) imag(tmp)], produced by rotating the vector [real(xin) imag(xin)]$^t$ by the angle $\Phi$ using the CORDIC algorithm, to the internal $\theta$ cells $220_1$ and $220_2$ respectively.

In addition, the internal $\Phi$ cell 210 propagates the supplied vector angle $\Phi$ directly to the right and supplies it to the internal super cell 200 in the same row.

Each of the two internal $\theta$ cells $220_1$ and $220_2$ receives the input xin, the vector angle $\theta$, and the internal variable r, uses the CORDIC algorithm to perform the vector rotation processing represented by $$x\text{out}=\cos\theta\cdot x\text{in}-\sin\theta\cdot r$$

$$r=\sin\theta\cdot x\text{in}+\cos\theta\cdot r \tag{6}$$

and computes the output xout and the internal variable r.

FIG. 4 shows the processing also in the matrix multiplication format by separating the above-described processing into two, that is, real component processing and imaginary component processing. The internal θ cells $220_1$ and $220_2$ correspond respectively to the real component part and the imaginary component of the vector rotation processing. The terminal cell 300 does not perform any operation in step 1.

Next, the operation of step 2 will be described.

In the boundary super cell 100, the input xin is supplied to the boundary Φ cell 110 from the upper side.

In addition, the phase shift parameter $Φ_c$ is supplied to the boundary Φ cell 110 from the upper left side.

The boundary Φ cell 110 uses the CORDIC algorithm to calculate the norm |xin| of the vector $[\text{real}(x\text{in})\ \text{imag}(x\text{in})]^t$ and supplies the computation result to the boundary θ cell 120.

In addition, the boundary angle Φ cell 110 supplies the vector angle Φ of $[\text{real}(x\text{in})\ \text{imag}(x\text{in})]^t$ to the internal super cell 200 in the same row.

The boundary Φ cell 110 also adds the vector Φ to the phase shift parameter $Φ_c$, received from the upper left side, to generate a new phase shift parameter $Φ_c$ and supplies it to the boundary Φ cell 110 in the lower right side or the terminal cell 300.

The boundary θ cell 120 receives the norm |xin| and uses the CORDIC algorithm to perform the following division.

$$d=|x\text{in}|/r \tag{7}$$

The division result d is propagated to the right as the multiply-and-accumulate coefficient and is supplied to the internal super cell 200 in the same row.

In the internal super cell 200, the input xin from the upper side and the vector angle Φ from the left side are supplied to the internal Φ cell 210.

In addition, the internal Φ cell 210 supplies the vector [real(tmp) imag(tmp)], produced by rotating the vector $[\text{real}(x\text{in})\ \text{imag}(x\text{in})]^t$ by angle Φ using the CORDIC algorithm, to the internal θ cells $220_1$ and $220_2$ respectively.

The internal Φ cell 210 also propagates the supplied vector angle Φ directly to the right and supplies it to the internal super cell 200 in the same row.

Each of the two internal θ cells $220_1$ and $220_2$ receives xin, the internal variable r, and the multiply-and-accumulate coefficient d, uses the CORDIC algorithm to perform the multiply-and-accumulate processing represented by $$x\text{out}=x\text{in}-d\cdot r \tag{8}$$

and computes the output xout. The internal variable r is not updated.

FIG. 4 shows the processing also in the matrix multiplication format by separating the above-described processing into two, that is, real component processing and imaginary component processing.

The internal θ cells $220_1$ and $220_2$ correspond respectively to the real component part and the imaginary component of the vector rotation processing.

The terminal cell 300 receives the input xin from the upper side and the phase shift parameter $Φ_c$ from the upper left side, computes the vector [real(xout) imag(xout)] produced by rotating the vector $[\text{real}(x\text{in})\ \text{imag}(x\text{in})]^t$ by angle Φc, and outputs the result outside of the complex matrix computing systolic array 4000.

The following describes the ability of the complex matrix computing systolic array 4000 in this exemplary embodiment to perform complex matrix computation by contrasting the complex matrix computing systolic array 4000 with the real MFA systolic array 4001 disclosed in Non-Patent Document 2.

The processing in step 1 of the array in the first row of the real MFA systolic array 4001 is the Givens rotation in which the input $x\text{in}_{k1}$ (k is a natural number from 1 to 2) to the boundary cell 101 is set to 0. This processing is represented by Expressions (9) and (10) given below.

$$\begin{bmatrix} r_{11} & r_{12} & r_{13} & r_{14} \\ 0 & x_{out,12} & x_{out,13} & x_{out,14} \end{bmatrix} = \tag{9}$$
$$\begin{bmatrix} c_1 & s_1 \\ -s_1 & c_1 \end{bmatrix} \begin{bmatrix} r_{11} & r_{12} & r_{13} & r_{14} \\ x_{in,11} & x_{in,12} & x_{in,13} & x_{in,14} \end{bmatrix}$$

$$c_1^2 + s_1^2 = 1 \tag{10}$$

Expressions (11) and (12) show the forms of Expressions (9) and (10) that are expanded for use in the complex number processing.

$$\begin{bmatrix} r_{11} & r_{12} & r_{13} & r_{14} \\ 0 & x'_{out,12} & x'_{out,13} & x'_{out,14} \end{bmatrix} = \tag{11}$$
$$\begin{bmatrix} c_1 & s_1^* \\ -s_1 & c_1 \end{bmatrix} \begin{bmatrix} r_{11} & r_{12} & r_{13} & r_{14} \\ x_{in,11} & x_{in,12} & x_{in,13} & x_{in,14} \end{bmatrix}$$

$$c_1^2 + |s_1^2| = 1 \tag{12}$$

In the description below, the intermediate result of the complex MFA algorithm is represented by xout' and the intermediate result of this exemplary embodiment is represented by xout to distinguish between them.

c1 and s1 that satisfy Expressions (11) and (12) are given respectively by Expressions (13) and (14) shown below.

$$\theta=\arctan(|x_{in,11}|/r) \tag{13}$$

$$\phi=\arctan(\text{imag}(x_{x,11})/\text{imag}(x_{in,11})) \tag{14}$$

$$c_1=\cos\theta \tag{15}$$

$$s_1=\sin\theta * e^{i\phi} \tag{16}$$

Substituting Expressions (13), (14), (15), and (16) into Expression (11) changes it to Expressions (17) and (18) as shown below.

$$\begin{bmatrix} r_{11} & r_{12} & r_{13} & r_{14} \\ 0 & x'_{out,12} & x'_{out,13} & x'_{out,14} \end{bmatrix} = \begin{bmatrix} \cos\theta & \sin\theta^+ e^{-i\phi} \\ -\sin\theta^+ e^{i\phi} & \cos\theta \end{bmatrix} \tag{17}$$
$$\begin{bmatrix} r_{11} & r_{12} & r_{13} & r_{14} \\ x_{in,11} & x_{in,12} & x_{in,13} & x_{in,14} \end{bmatrix}$$
$$= \begin{bmatrix} \cos\theta & \sin\theta \\ -\sin\theta^+ e^{i\phi} & \cos\theta^+ e^{i\phi} \end{bmatrix}$$
$$\begin{bmatrix} r_{11} & r_{12} & r_{13} & r_{14} \\ tmp_{11} & tmp_{12} & tmp_{13} & tmp_{14} \end{bmatrix}$$

$$tmp = x_{in} e^{-i\phi} \tag{18}$$

On the other hand, the processing in step 1 of the array in the first row of the complex matrix computing systolic array 4000 in this exemplary embodiment is represented by Expressions (19) and (20) given below.

$$\begin{bmatrix} r_{11} & r_{12} & r_{13} & r_{14} \\ 0 & x_{out,12} & x_{out,13} & x_{out,14} \end{bmatrix} = \begin{bmatrix} \cos\theta & \sin\theta \\ -\sin\theta & \cos\theta \end{bmatrix} \begin{bmatrix} r_{11} & r_{12} & r_{13} & r_{14} \\ tmp_{11} & tmp_{12} & tmp_{13} & tmp_{14} \end{bmatrix} \quad (19)$$

$$tmp = x_{in} e^{-i\phi} \quad (20)$$

Expression (20) is the same as Expression (18).

Comparison between Expression (17) and Expression (19) indicates that the internal variables r in the complex matrix computing systolic array 4000 are the same as the internal variables r used in the complex MFA algorithm.

In addition, because the coefficient $e^{i\Phi}$ is multiplied, the output xout to the lower side of the array in the first row of the complex matrix computing systolic array 4000 is shifted in phase by the angle of $\Phi$ with respect to the intermediate result xout' of the complex MFA algorithm. However, because this phase shift is applied to all the outputs xout in the second row, the lag is absorbed by the vector rotation processing of the boundary $\Phi$ cell 110 and the internal $\Phi$ cell 210 of the array in the second row and, so, the phase shift does not affect the computation of the internal variable r of the array in the second row performed by the boundary $\theta$ cell 120 and the internal $\theta$ cells 220.

As a result, the internal variable r saved in the super cells at the time the first step of the complex matrix computing systolic array 4000 in this exemplary embodiment is terminated is the same as that computed by the complex MFA algorithm.

Next, the equivalency of step 2 will be described.

The processing in step 2 of the array in the first row of the real MFA systolic array 4001 disclosed in Non-Patent Document 2 is the Gaussian elimination method in which the inputs $xin_{k1}$ (where, k is a natural number from 1 to 2) to the boundary cell 101 are set to 0 with r11 as the pivot, and this processing is represented by Expression (21) given below. Similarly, the processing in step 2 of the array in the second row is represented by Expression (22) given below.

$$\begin{bmatrix} r_{11} & r_{12} & r_{13} & r_{14} \\ 0 & x'_{out,12} & x'_{out,13} & x'_{out,14} \end{bmatrix} = \begin{bmatrix} 1 & 0 \\ -x_{in,11}/r_{11} & 1 \end{bmatrix} \begin{bmatrix} r_{11} & r_{12} & r_{13} & r_{14} \\ x_{in,11} & x_{in,12} & x_{in,13} & x_{in,14} \end{bmatrix} \quad (21)$$

$$\begin{bmatrix} r_{22} & r_{23} & r_{24} \\ 0 & x'_{out,23} & x'_{out,24} \end{bmatrix} = \begin{bmatrix} 1 & 0 \\ -x'_{out,12}/r_{22} & 1 \end{bmatrix} \begin{bmatrix} r_{22} & r_{23} & r_{24} \\ x'_{out,12} & x'_{out,13} & x'_{out,14} \end{bmatrix} \quad (22)$$

When xin and xout' are complex numbers, Expressions (21) and (22) may be applied directly to the complex MFA algorithm.

When changed using Expressions (23), (24), (25), and (26) given below, Expression (21) and Expression (22) are represented by Expressions (27) and (28) respectively.

$$\phi_1 = \arctan(imag(x_{in,11})/imag(x_{in,11})) \quad (23)$$

$$d_1 = |x_{in,11}|/r_{11} \quad (24)$$

$$\phi'_2 = \arctan(imag(x'_{out,12})/imag(x'_{out,12})) \quad (25)$$

$$d_2 = |x'_{out,12}|/r_{22} \quad (26)$$

$$\begin{bmatrix} r_{11} & r_{12} & r_{13} & r_{14} \\ 0 & x'_{out,12} & x'_{out,13} & x'_{out,14} \end{bmatrix} = \begin{bmatrix} 1 & 0 \\ -d_1 e^{j\phi_1} & 1 \end{bmatrix} \begin{bmatrix} r_{11} & r_{12} & r_{13} & r_{14} \\ x_{in,11} & x_{in,12} & x_{in,13} & x_{in,14} \end{bmatrix} \quad (27)$$

$$\begin{bmatrix} r_{22} & r_{23} & r_{24} \\ 0 & x'_{out,23} & x'_{out,24} \end{bmatrix} = \begin{bmatrix} 1 & 0 \\ -d_2 e^{j\phi'_1} & 1 \end{bmatrix} \begin{bmatrix} r_{22} & r_{23} & r_{24} \\ x'_{out,12} & x'_{out,13} & x'_{out,14} \end{bmatrix} \quad (28)$$

On the other hand, the processing in step 2 of the array in the first row of the complex matrix computing systolic array 4000 in this exemplary embodiment is represented by Expression (29) given below.

$$\begin{bmatrix} r_{11} & r_{12} & r_{13} & r_{14} \\ 0 & x_{out,12} & x_{out,13} & x_{out,14} \end{bmatrix} = \begin{bmatrix} 1 & 0 \\ -d_1 & e^{j\phi_1} \end{bmatrix} \begin{bmatrix} r_{11} & r_{12} & r_{13} & r_{14} \\ x_{in,11} & x_{in,12} & x_{in,13} & x_{in,14} \end{bmatrix} \quad (29)$$

Comparison between Expression (27) and Expression (29) indicates that the output xout to the lower side of the array in the first row of the complex matrix computing systolic array 4000 is shifted in phase by the angle of $\Phi_1$ with respect to the intermediate result xout' of the complex MFA algorithm because the coefficient $e^{-\Phi_1}$ is multiplied.

The boundary $\Phi$ cell 110 adds the phase shift parameter $\Phi_c$, received from the upper left side, to the vector angle of the input signal received from the upper side and supplies the result to the lower-right cell as a new phase shift parameter $\Phi_{c'}$. The boundary $\Phi$ cell 110 in the first row outputs the angle $\Phi_1$ directly as the phase shift parameter $\Phi_{c1}$ because the input phase shift parameter $\Phi_{c0}$ is fixed to 0.

The processing in step 2 of the array in the second row of the complex matrix computing systolic array 4000 in this exemplary embodiment is represented by Expressions (30) and (31) given below.

$$\phi_2 = \arctan(imag(x_{out,12})/imag(x_{out,12})) = \phi'_2 - \phi_1 \quad (30)$$

$$\begin{bmatrix} r_{22} & r_{23} & r_{24} \\ 0 & x_{out,23} & x_{out,24} \end{bmatrix} = \begin{bmatrix} 1 & 0 \\ -d_2 & e^{-j\phi_1} \end{bmatrix} \begin{bmatrix} r_{22} & r_{23} & r_{24} \\ x_{out,12} & x_{out,13} & x_{out,14} \end{bmatrix}$$

$$= \begin{bmatrix} 1 & 0 \\ -d_2 & e^{-j(\phi'_1-\phi_1)} \end{bmatrix} \begin{bmatrix} r_{22} & r_{23} & r_{24} \\ e^{-j\phi_1} x'_{out,12} & e^{-j\phi_1} x'_{out,13} & e^{-j\phi_1} x'_{out,14} \end{bmatrix}$$

$$= \begin{bmatrix} 1 & 0 \\ -d_2 & e^{-j(\phi'_1-\phi_1)} \end{bmatrix} \begin{bmatrix} r_{22} & r_{23} & r_{24} \\ x'_{out,12} & x'_{out,13} & x'_{out,14} \end{bmatrix} \quad (31)$$

Comparison between Expression (28) and Expression (31) indicates that the output xout to the lower side of the array in the second row of the complex matrix computing systolic array 4000 is shifted in phase by the angle of $\Phi_2$, with respect to the output result xout' of the complex MFA algorithm because the coefficient $e^{-i\Phi_{2'}}$ is multiplied.

The boundary Φ cell 110 in the first row adds the vector angle $\Phi_2$ of the input signal, received from the upper side, to the input phase shift parameter $\Phi_{c1}$ and supplies the result to the terminal cell 300 in the lower right as the phase shift parameter $\Phi_{c2}$.

The terminal cell 300 vector-rotates the output xout to the lower side of the array in the second row of the complex matrix computing systolic array 4000 by the angle of $\Phi_{c2}$, and outputs the result outside of the complex matrix computing systolic array 4000.

$$\phi c_2 = \phi_2 - \phi c_1 = (\phi_2' - \phi_1) + \phi_1 = \phi_2' \qquad (32)$$

Because the phase shift with respect to the output result xout' of the complex MFA algorithm is caused and $\Phi_{c2}$ matches $\Phi_{2'}$ as shown in Expression (32), the output of the complex matrix computing systolic array 4000 in this exemplary embodiment matches the output result xout' of the complex MFA algorithm.

Although the terminal cell 300 is required for correcting a phase shift, the complex matrix computing systolic array 4000 in this exemplary embodiment eliminates the need for inter-cell synchronization control because the inter-cell connection is fixed.

In contrast, when the complex MFA algorithm is implemented by the cells each of which is configured by the CORDIC circuit, the inter-cell connection must be changed and the synchronization of cell input/output signal must be controlled each time the operation is switched from one step to the next.

For example, consider the case in which step 1 is implemented by the complex matrix computing systolic array 4000 in this exemplary embodiment and step 2 is implemented by the complex MFA algorithm.

Figure 5:
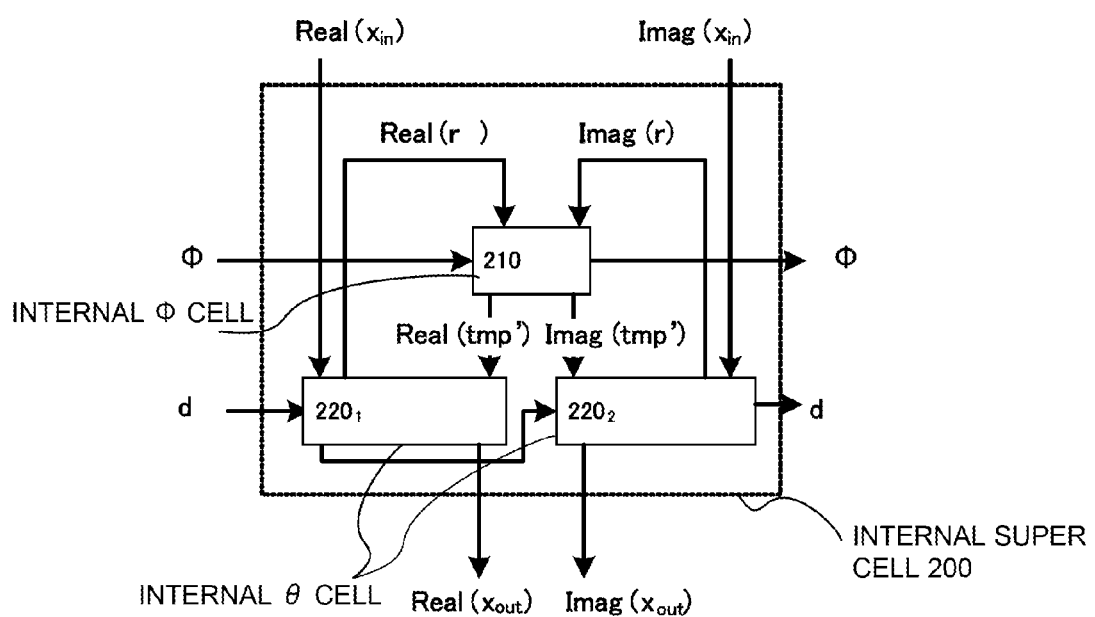
FIG. 5 is a diagram showing the configuration of the internal super cell that implements the second step of the complex MFA.

In the array in the first row that implements Expression (27), the parameters $\Phi_1$ and $d_1$ shown in Expressions (23) and (24) may be computed in order of $\Phi_1$ and $d_1$ in the boundary super cell 100 shown in FIG. 2.

xout in Expression (27) can be computed by changing the connection relation in the internal super cell 200 as shown in FIG. 5. In step 2 in FIG. 5, the internal Φ cell 210 and the internal θ cells 220 perform the following Expressions (33) and (34) respectively.

$$tmp' = r\exp(-i\phi) \qquad (33)$$

$$\begin{bmatrix} \text{real}(r) & \text{imag}(r) \\ \text{real}(x_{out}) & \text{imag}(x_{out}) \end{bmatrix} = \begin{bmatrix} 1 & 0 \\ -d & 1 \end{bmatrix} \begin{bmatrix} \text{real}(x_{in}) & \text{imag}(x_{in}) \\ \text{real}(tmp) & \text{imag}(tmp) \end{bmatrix} \qquad (34)$$

Figure 6:
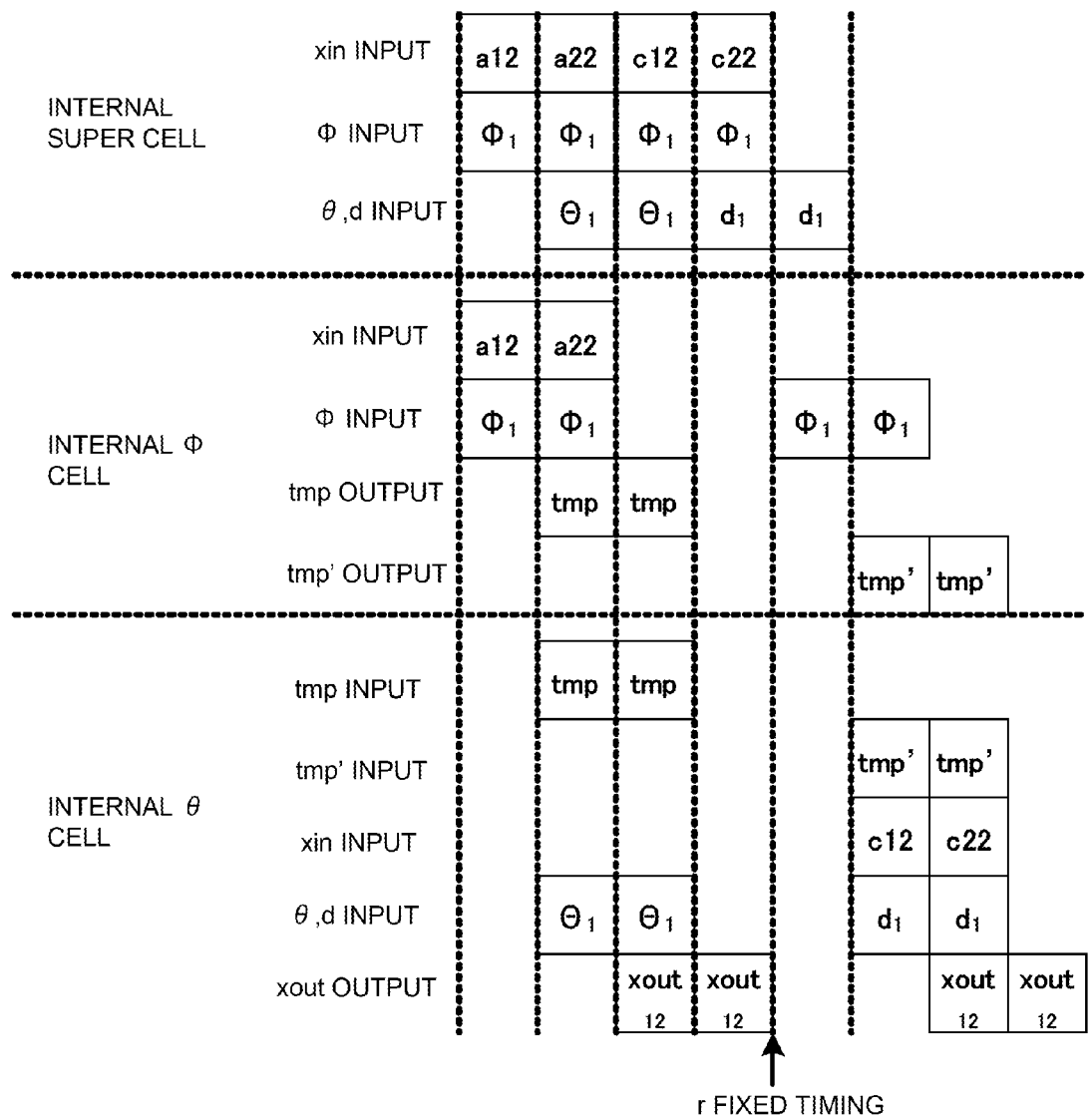
FIG. 6 is a timing chart showing the input/output timing operation of the internal super cells when the cell connection is changed.

FIG. 6 is a timing chart showing the operation of the internal super cells $200_1$ and $200_2$ when the cell connection is changed as described above.

Because the time at which signals are input to the internal super cell $200_1$ and $200_2$ differ from the time at which the signals are used in the internal Φ cell 210 and the internal θ cells 220 as shown in FIG. 6, complicated timing control is required.

This is because, after the processing of step 1 of the internal θ cells 220 is terminated and r is fixed, the processing of step 2 of the internal Φ cell 210 is started.

Figure 7:
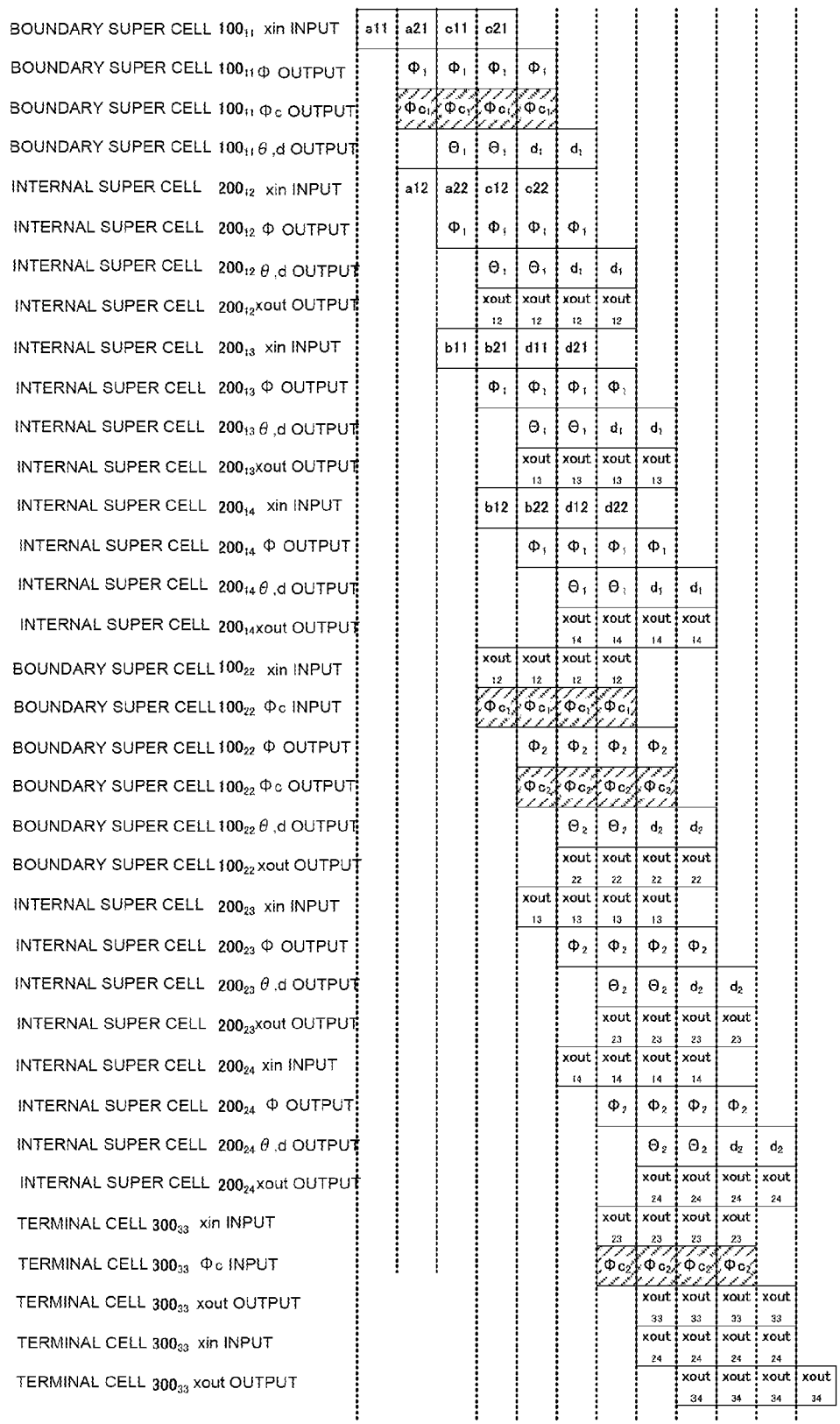
FIG. 7 is a timing chart showing the input/output timing operation of the processing cells included in the first exemplary embodiment of the present invention.
Figure 8A:
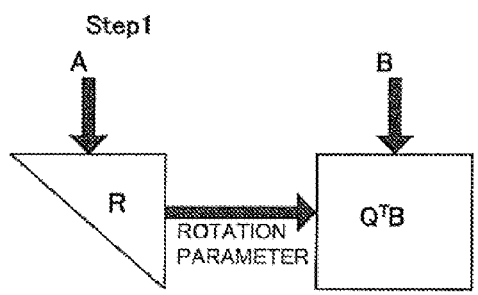
FIGS. 8A and 8B are diagrams showing the signal flow graphs of the MFA algorithm.
Figure 8B:
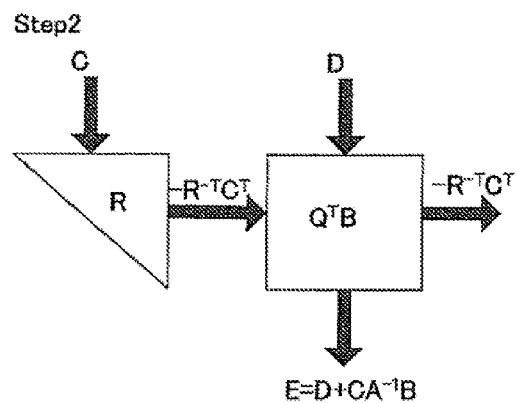

FIG. 7 is a timing chart showing the operation of the complex matrix computing systolic array 4000 in the exemplary embodiment. FIG. 7 shows that timing control is required only to delay the phase-lag parameter $\Phi_c$, shown by shading, by means of the delay circuit 400 for the length of time during which the CORDIC processing is performed twice.

Although the example is used in the description of this exemplary embodiment where the matrix sizes are A(2×2), B(2×2), C(2×2), and D(2×2), the present invention is applicable to any matrix size.

The present invention is not limited to configuration of a two-dimensional systolic array but, of course, includes the configuration in which a two-dimensional systolic array is projected into a one-dimensional array or the configuration in which a two-dimensional systolic array is processed in time division mode. The complex matrix computing systolic array used in the exemplary embodiment described above is applicable to complex matrix computations of the signal processing in a wired or wireless communication system or an image processing system.

The exemplary embodiment and the examples may be changed and adjusted in the scope of the entire disclosure (including claims) of the present invention and based on the basic technological concept. In the scope of the claims of the present invention, various disclosed elements may be combined and selected in a variety of ways. That is, the present invention of course includes various modifications and changes that may be made by those skilled in the art according to the entire disclosure, including the claims, and the technological concept.

The invention claimed is:

1. An apparatus that comprises a systolic array of processing units and that receives matrices and performs complex matrix computation on the matrices received using MFA (Modified Faddeeva Algorithm) to output a processing result, the systolic array of processing units comprising:
   a trapezoid systolic array of processing units that includes a triangular systolic array of processing units and a square systolic array of processing units, the trapezoid systolic array of processing units receiving the matrices as an input at a first row of thereof; and
   a linear systolic array of processing units arranged corresponding to a last row of the square systolic array of processing units, the linear systolic array of processing units receiving an output from the last row of the square systolic array of processing units and outputting the processing result,
   processing units arranged in one row in the trapezoid systolic array supplying a phase-shifted MFA intermediate processing result to processing units arranged in a row following the one row,
   processing units arranged in the following row receiving the phase-shifted MFA intermediate processing result and performing phase rotation processing to the phase-shifted MFA intermediate processing result received to absorb an effect of a phase shift, and
   the linear systolic array of processing units correcting a phase shift of an MFA processing result output from processing units arranged in the last row of the trapezoid systolic array, wherein
   each of second and subsequent rows of the trapezoid systolic array of processing units comprises:
   a boundary processing unit that receives a first component of the phase-shifted MFA intermediate processing result and a phase shift parameter supplied from the preceding row and generates first and second vector rotation parameters, a multiply-and-accumulate accumulate coeffeicient, and a phase shift parameter; and
   a plurality of internal processing units each of which receives a component other than the first component of the phase-shifted MFA intermediate processing result, and first and second vector rotation parameter and the multiply-and-accumulate coefficient and supplies the phase-shifted MFA intermediate processing result to the following row.

2. The apparatus according to claim 1, wherein each of the boundary processing unit and the internal processing unit includes a super cell including a plurality of processing cells.

3. The apparatus according to claim 2, wherein each of the processing cells comprises:
 a CORDIC(Coordinate Rotation Digital Computer) circuit that processes vector angle computation, vector rotation, division, and multiply-and-accumulate with a predetermined delay,
 a connection relation among the processing cells being fixed.

4. The apparatus according to claim 1, wherein the boundary processing unit comprises:
 first and second boundary processing cells, wherein
 in a first step,
 the first boundary processing cell
 generates, based on an input signal from the internal processing unit in a preceding row, a norm of the input signal and a vector angle of a vector having a real part and an imaginary part of the input signal as elements, and
 supplies the vector angle as the first vector rotation parameter to an internal processing unit in the same row, and
 the second boundary processing cell
 generates a norm and a vector angle of a vector having an internal variable and the norm of the input signal as elements, supplies the vector angle as the second vector rotation parameter to the internal processing unit in the same row, and updates the internal variable by the vector norm, and wherein
 in a second step,
 the first boundary processing cell
 generates, based on an input signal from the internal processing unit in the preceding row, a norm of the input signal and a vector angle of a vector having a real part and an imaginary part of the input signal as elements,
 supplies the vector angle as the first vector rotation parameter to the internal processing unit in the same row, and
 adds the phase shift parameter, supplied from the preceding row, where the phase shift parameter supplied from the preceding row in a first row in the first boundary processing cell is 0, to the first vector rotation parameter and supplies the resulting parameter to the following row, and
 the second boundary processing cell divides the norm of the input signal by the internal variable and supplies the division result as the multiply-and-accumulate coefficient to the internal processing unit in the same row.

5. The apparatus according to claim 1, wherein the internal processing unit comprises first to third internal processing cells, wherein
 in a first step,
 the first internal processing cell
 phase-rotates an input signal from the internal processing unit in a preceding row by an angle indicated by the first vector rotation parameter to generate a phase-rotated input signal,
 the second internal processing cell
 rotates a vector having a real part of the phase-rotated input signal and a real part of the internal variable as elements by an angle indicated by the second vector rotation parameter, updates the real part of the internal variable by a first element of the vector, and supplies a second element to the following row, and
 the third internal processing cell
 rotates a vector having an imaginary part of the phase-rotated input signal and an imaginary part of the internal variable as elements by an angle indicated by the second vector rotation parameter, updates the imaginary part of the internal variable by a first element of the vector, and supplies a second element to the following row, and wherein
 in a second step,
 the first internal processing cell
 phase-rotates the input signal, received from the internal processing unit in the preceding row, by an angle indicated by the first vector rotation parameter to generate a phase-rotated input signal,
 the second internal processing cell supplies a value, generated by adding the product of the real part of the internal variable and the multiply-and-accumulate coefficient to the real part of the phase-rotated input signal, to the following row, and
 the third internal processing cell supplies a value, generated by adding the product of the imaginary part of the internal variable and the multiply-and-accumulate coefficient to the imaginary part of the phase-rotated input signal, to the following row.

6. The apparatus according to claim 1, wherein one side of the triangular systolic array of processing units and one side of the square systolic array of processing units are joined together to form a longer side of the two opposed parallel sides of the trapezoid systolic array of processing units,
 another side opposed to the one side of the square systolic array of processing units forms a shorter side of the trapezoid systolic array,
 the trapezoid systolic array has the longer side as an upper side of the trapezoid, and the shorter side as a lower side of the trapezoid,
 the linear systolic array of processing units being arranged in a position opposed to the lower side of the trapezoid systolic array of processing units,
 the trapezoid systolic array of processing units receives an input from the upper-side side, and delivers an output to the linear systolic array of processing units positioned on the lower-side side of the trapezoid systolic array of processing units,
 the boundary processing unit is arranged on the hypotenuse of the triangular systolic array, and
 the internal processing units are arranged in rows and in columns other than rows and columns on the hypotenuse of the triangular systolic array and in rows and in columns of the square systolic array.

7. The apparatus according to claim 6, wherein the boundary processing unit comprises:
 first and second boundary processing cells, wherein
 in a first step,
 an input(xin) from an upper side is supplied to the first boundary processing cell, and the first boundary processing cell computes a first norm(|xin|), which is the norm of a vector having a real part and an imaginary part of the input(xin) as elements, and a first vector angle($\Phi$) that is the vector angle of the first norm, supplies the first norm(|xin|) to the second boundary processing cell, and supplies the first vector angle($\Phi$) to an adjacent internal processing unit in the same row, and
 the second boundary processing cell receives the first norm (|xin|) from the first boundary processing cell, computes a second norm(t), which is the norm of a vector having an internal variable(r) and the first norm(|xin|) as elements, and a second vector angle(θ) that is the vector angle of the second norm, updates the internal variable (r) by the second norm(t), and supplies the second vector angle(θ) to the adjacent internal processing unit in the same row, and wherein in a second step, an input(xin) from an upper side is supplied to the first boundary processing cell, and a phase shift parameter (Φc) is supplied from the boundary processing unit in an upper oblique direction to the first boundary processing cell in the boundary processing unit in second and subsequent rows, the first boundary processing cell computes a first norm (|xin|), which is the norm of a vector having a real part and an imaginary part of the input(xin) as elements, and a first vector angle(Φ) that is the vector angle of the first norm, supplies the first norm(|xin|) to the second boundary processing cell, supplies the first vector angle(Φ) to the adjacent internal processing unit in the same row, and supplies a value, created by adding the first vector angle (Φ) to the phase shift parameter(Φc) received from the boundary processing unit in the upper oblique direction, to the first boundary processing cell of the boundary processing unit in the lower oblique direction or to a terminal cell in the linear systolic array as a new phase shift parameter(Φc), and the second boundary processing cell receives the first norm (|xin|) from the first boundary processing cell, computes a value d(=|xin|/r) by dividing the first norm(|xin|) by the internal variable(r), and supplies the division result (d) to the adjacent internal processing unit in the same row as a multiply-and-accumulate coefficient.

8. The apparatus according to claim 7, wherein the internal processing unit comprises first to third internal processing cells, wherein in a first step, an input(xin) from an upper side and the first vector angle (Φ), propagated from the adjacent cell on a side of the boundary processing unit in the same row, are supplied to the first internal processing cell of the internal processing unit, the first internal processing cell supplies a vector(tmp), generated by rotating a vector having a real part and an imaginary part of the input(xin) as elements by the first vector angle(Φ), to the second and third internal processing cells of the internal processing unit respectively, the first internal processing cell supplies the first vector angle(Φ), supplied from the adjacent cell on the side of the boundary processing unit in the same row, directly to a first internal processing cell of an adjacent internal processing unit in a direction opposite to the boundary processing unit in the same row, and the second and third internal processing cells (internal θcells) calculate an output(xout) and an internal variable (r) by performing vector rotation processing represented by $$xout = \cos\theta \cdot tmp - \sin\theta \cdot r$$

$$r = \sin\theta \cdot tmp + \cos\theta \cdot r$$

for the vector(tmp), the internal variable(r), and the first vector angle(θ), and wherein in a second step, an input(xin) from the upper side and the first vector angle (Φ), propagated from the adjacent cell on the side of the boundary processing unit in the same row, are supplied to the first internal processing cell of the internal processing unit, the first internal processing cell supplies a vector(tmp), generated by rotating a vector having a real part and an imaginary part of the input(xin) as elements by the first vector angle(Φ), to the second and third internal processing cells respectively, the first internal processing cell supplies the first vector angle(Φ), supplied from the adjacent cell on the side of the boundary processing unit, directly to the first internal processing unit of the adjacent internal processing unit in a direction opposite to the boundary processing unit in the same row, the second and third internal processing cells calculate an output(xout) by performing multiply-and-accumulate processing represented by $$xout = tmp - d \cdot r, \text{ and}$$

a terminal cell of the linear systolic array receives the output(xout) from the internal processing unit at the bottom of the trapezoid systolic array as an input(xin) from the upper side, receives a phase shift parameter (Φc) from the boundary processing unit in the upper oblique direction, and computes a vector by rotating a vector having a real part and an imaginary part of the input(xin) as elements by an angle(Φc) and outputs the result as an output(xout).

9. The apparatus according to claim 1, wherein the linear systolic array comprises:

a plurality of terminal processing cells each of which performs phase rotation for an input signal from the internal processing unit in the last row of the trapezoid systolic array based on the phase shift parameter supplied from the last row of the trapezoid systolic array.

10. A communication system comprising the systolic array apparatus according to claim 1.

11. An image processing system comprising the systolic array apparatus according to claim 1.

12. A computation method using a complex matrix computing systolic array that uses MFA (Modified Faddeeva Algorithm), the method comprising:

providing a linear systolic array for a trapezoid systolic array that includes a triangular systolic array and a square systolic array;

each one row in the trapezoid systolic array outputting a phase-shifted intermediate processing result to the row following the one row, and the following row performing phase rotation processing to absorb an effect of a phase shift; and the linear systolic array correcting a phase shift in an MFA processing result output from the last row of the trapezoid systolic array, in each of second and subsequent rows of the trapezoid systolic array, a boundary processing unit receiving a first component of the phase-shifted MFA intermediate processing result and a phase shift parameter supplied from the preceding row and generating first and second vector rotation parameters, a multiply-and-accumulate coefficient, and a phase shift parameter; and each of a plurality of internal processing units receiving a component other than the first component of the phase-shifted MFA intermediate processing result, the first and second vector rotation parameters, and the multiplyand-accumulate coefficient and supplying the phase-shifted MFA intermediate processing result to the following row.

13. The method according to claim 12, wherein each of the boundary processing unit and the internal processing unit includes a super cell including a plurality of processing cells.

14. The method according to claim 13, wherein each of the processing cells includes a CORDIC(Coordinate Rotation Digital Computer) circuit that processes vector angle computation, vector rotation, division, and multiply-and-accumulate with a predetermined delay, a connection relation among the processing cells being fixed.

15. The method according to claim 1, comprising a first step and a second step, wherein in the first step,
a first boundary processing cell
generates, based on an input signal from the internal processing unit in a preceding row, a norm of the input signal and a vector angle of a vector having a real part and an imaginary part of the input signal as elements and
supplies the vector angle as the first vector rotation parameter to an internal processing unit in the same row, and
a second boundary processing cell
generates a norm and a vector angle of a vector having an internal variable and the norm of the input signal as elements, supplies the vector angle as the second vector rotation parameter to the internal processing unit in the same row, and updates the internal variable by the vector norm, and wherein
in the second step,
the first boundary processing cell
generates, based on an input signal from the internal processing unit in the preceding row, a norm of the input signal and a vector angle of a vector having a real part and an imaginary part of the input signal as elements,
supplies the vector angle as the first vector rotation parameter and to the internal processing unit in the same row, in addition,
adds the phase shift parameter, supplied from the preceding row, where the phase shift parameter supplied from the preceding row in a first row in the first boundary processing cell is 0, to the first vector rotation parameter and supplies the resulting parameter to the following row and
the second boundary processing cell divides the norm of the input signal by the internal variable and supplies the division result as the multiply-and-accumulate coefficient to the internal processing unit in the same row.

16. The method according to claim 12, comprising a first step and a second step, wherein in the first step,
a first internal processing cell of the internal processing unit
phase-rotates an input signal from the internal processing unit in a preceding row by an angle indicated by the first vector rotation parameter to generate a phase-rotated input signal,
a second internal processing cell of the internal processing unit
rotates a vector having a real part of the phase-rotated input signal and a real part of the internal variable as elements by an angle indicated by the second vector rotation parameter, updates the real part of the internal variable by a first element of the vector, and supplies a second element to the following row, and
a third internal processing cell of the internal processing unit rotates a vector having an imaginary part of the phase-rotated input signal and an imaginary part of the internal variable as elements by an angle indicated by the second vector rotation parameter, updates the imaginary part of the internal variable by a first element of the vector, and supplies a second element to the following row, and wherein in the second step,
the first internal processing cell
phase-rotates the input signal, received from the internal processing unit in the preceding row, by an angle indicated by the first vector rotation parameter to generate a phase-rotated input signal,
the second internal processing cell supplies a value, generated by adding the product of the real part of the internal variable and the multiply-and-accumulate coefficient to the real part of the phase-rotated input signal, to the following row, and
the third internal processing cell supplies a value, generated by adding the product of the imaginary part of the internal variable and the multiply-and-accumulate coefficient to the imaginary part of the phase-rotated input signal, to the following row.

17. The method according to claim 12, wherein one side of the triangular systolic array and one side of the square systolic array are joined together to form a longer side of the two opposed parallel sides of the trapezoid systolic array, another side opposed to the one side of the square systolic array forms a shorter side of the trapezoid systolic array,
the trapezoid systolic array has the longer side as an upper side, and the shorter side as a lower side,
the linear systolic array is arranged in a position opposed to the lower side of the trapezoid systolic array,
the trapezoid systolic array receives an input from the upper-side side, and outputs an output from the linear systolic array positioned on the lower-side side of the trapezoid systolic array,
the boundary processing unit is arranged on the hypotenuse of the triangular systolic array, and
the internal processing units are arranged in rows and in columns other than rows and columns on the hypotenuse of the triangular systolic array and in rows and in columns of the square systolic array.

18. The method according to claim 17, comprising a first step and a second step, wherein in the first step,
an input(xin) from an upper side is supplied to a first boundary processing cell of the boundary processing unit, and the first boundary processing cell computes a first norm(|xin|), which is the norm of a vector having a real part and an imaginary part of the input(xin) as elements, and a first vector angle($\Phi$) that is the vector angle of the first norm, supplies the first norm(|xin|) to the second boundary processing cell, and supplies the first vector angle($\Phi$) to an adjacent internal processing unit in the same row, and
a second boundary processing cell of the boundary processing unit receives the first norm(|xin|) from the first boundary processing cell, computes a second norm(t), which is the norm of a vector having an internal variable (r) and the first norm(|xin|) as elements, and a second vector angle($\theta$) that is the vector angle of the second norm, updates the internal variable(r) by the second norm(t), and supplies the second vector angle($\theta$) to the adjacent internal processing unit in the same row, and wherein in the second step,
an input(xin) from an upper side is supplied to the first boundary processing cell, and a phase shift parameter (Φc) is supplied from the boundary processing unit in an upper oblique direction to the first boundary processing cell in the boundary processing unit in second and subsequent rows,
the first boundary processing cell computes a first norm (|xin|), which is the norm of a vector having a real part and an imaginary part of the input(xin) as elements, and a first vector angle(Φ) that is the vector angle of the first norm, supplies the first norm(|xin|) to the second boundary processing cell, supplies the first vector angle(Φ) to the adjacent internal processing unit in the same row, and supplies a value, created by adding the first vector angle (Φ) to the phase shift parameter(Φc) received from the boundary processing unit in the upper oblique direction, to the first boundary processing cell of the boundary processing unit in the lower oblique direction or to a terminal cell in the linear systolic array as a new phase shift parameter(Φc), and
the second boundary processing cell receives the first norm (|xin|) from the first boundary processing cell, computes a value d(=|xin|/r) by dividing the first norm(|xin|) by the internal variable(r), and supplies the division result (d) to the adjacent internal processing unit in the same row as a multiply-and-accumulate coefficient.

19. The method according to claim 18, comprising a first step and a second step, wherein
in the first step,
an input(xin) from an upper side and the first vector angle (Φ), propagated from the adjacent cell on a side of the boundary processing unit in the same row, are supplied to a first internal processing cell of the internal processing unit,
the first internal processing cell supplies a vector(tmp), generated by rotating a vector having a real part and an imaginary part of the input(xin) as elements by the first vector angle(Φ), to second and third internal processing cells of the internal processing unit respectively,
the first internal processing cell supplies the first vector angle(Φ), supplied from the adjacent cell on the side of the boundary processing unit in the same row, directly to a first internal processing cell of an adjacent internal processing unit in a direction opposite to the boundary processing unit in the same row, and
the second and third internal processing cells (internal θcells) calculate an output(xout) and an internal variable (r) by performing vector rotation processing represented by $$xout = \cos\theta \cdot tmp - \sin\theta \cdot r$$

$$r = \sin\theta \cdot tmp + \cos\theta \cdot r$$

for the vector(tmp), the internal variable(r), and the first vector angle(θ), and wherein
in the second step,
an input(xin) from the upper side and the first vector angle (Φ), propagated from the adjacent cell on the side of the boundary processing unit in the same row, are supplied to the first internal processing cell of the internal processing unit,
the first internal processing cell supplies a vector(tmp), generated by rotating a vector having a real part and an imaginary part of the input(xin) as elements by the first vector angle(Φ), to the second and third internal processing cells respectively,
the first internal processing cell supplies the first vector angle(Φ), supplied from the adjacent cell on the side of the boundary processing unit, directly to the first internal processing unit of the adjacent internal processing unit in a direction opposite to the boundary processing unit in the same row,
the second and third internal processing cells calculate an output(xout) by performing multiply-and-accumulate processing represented by $$xout = tmp - d \cdot r, \text{ and}$$

a terminal cell of the linear systolic array receives the output(xout) from the internal processing unit at the bottom of the trapezoid systolic array as an input(xin) from the upper side, receives a phase shift parameter (Φc) from the boundary processing unit in the upper oblique direction, and computes a vector by rotating a vector having a real part and an imaginary part of the input(xin) as elements by an angle(Φc) and outputs the result as an output(xout).

20. The method according to claim 1, wherein the linear systolic array comprises:
a plurality of terminal processing cells each of which performs phase rotation for an input signal from the internal processing unit in the last row of the trapezoid systolic array based on the phase shift parameter supplied from the last row of the trapezoid systolic array.

21. A systolic array apparatus comprising:
a trapezoid systolic array including a triangular systolic array and a square systolic array, one side of the triangular systolic array and one side of the square systolic array being joined together to form a longer side that forms the upper side of the trapezoid systolic array; and
a linear systolic array arranged on a side of a shorter side that forms the lower side of the trapezoid systolic array,
each cell of each of the systolic arrays being implemented by a CORDIC circuit that processes vector angle computation, vector rotation, division, and multiply-and-accumulate with a predetermined delay,
the trapezoid systolic array receiving an input from a first row on a side of the upper side and an output being delivered from the linear systolic array located on the lower side of the trapezoid systolic array, wherein, in the trapezoid systolic array,
each of second and subsequent rows comprises:
a boundary processing unit that receives a first component of a phase-shifted complex MFA(Modified Faddeeva Algorithm) intermediate processing result and a phase shift parameter supplied from the preceding row and generates first and second vector rotation parameters, a multiply-and-accumulate coefficient, and a phase shift parameter; and
an internal processing unit that receives a component other than the first component of the phase-shifted MFA intermediate processing result, the first and second vector rotation parameters, and the multiply-and-accumulate coefficient and supplies the phase-shifted MFA intermediate processing result to the following row,
the intermediate result output from each row of the trapezoid systolic array to the following row being shifted in phase with respect to the intermediate result of the complex MFA algorithm, and the phase shift being absorbed by the following row,
the linear systolic array correcting a phase shift in the complex MFA processing result by performing phase rotation for an input signal from the internal processing unit in the bottom row of the trapezoid systolic array based on a phase shift parameter supplied from the bottom row of the trapezoid systolic array.

* * * * *